(12) United States Patent
Pitkow et al.

(10) Patent No.: US 10,193,908 B2
(45) Date of Patent: Jan. 29, 2019

(54) DATA TRANSFER FOR NETWORK INTERACTION FRAUDULENCE DETECTION

(71) Applicant: comScore, Inc., Reston, VA (US)

(72) Inventors: Jim Pitkow, San Francisco, CA (US); Raman Chelliah, San Carlos, CA (US); Marc Brown, Palo Alto, CA (US)

(73) Assignee: comScore, Inc., Reston, VA (US)

( * ) Notice: Subject to any disclaimer, the term of this patent is extended or adjusted under 35 U.S.C. 154(b) by 0 days.

(21) Appl. No.: 15/672,149

(22) Filed: Aug. 8, 2017

(65) Prior Publication Data

US 2017/0339173 A1 Nov. 23, 2017

Related U.S. Application Data

(63) Continuation of application No. 14/987,169, filed on Jan. 4, 2016, now Pat. No. 9,729,563, which is a continuation of application No. 14/468,891, filed on Aug. 26, 2014, now Pat. No. 9,231,982, which is a continuation of application No. 12/859,150, filed on Aug. 18, 2010, now Pat. No. 8,838,732, which is a continuation of application No. 11/986,312, filed on Nov. 19, 2007, now Pat. No. 7,801,985.

(60) Provisional application No. 61/190,066, filed on Mar. 22, 2007.

(51) Int. Cl.
*G06F 15/16* (2006.01)
*H04L 29/06* (2006.01)
*G06F 17/30* (2006.01)
*H04L 12/58* (2006.01)

(52) U.S. Cl.
CPC ...... *H04L 63/1416* (2013.01); *H04L 63/0218* (2013.01); *H04L 63/0263* (2013.01); *H04L 63/14* (2013.01); *H04L 63/1408* (2013.01); *H04L 63/1425* (2013.01); *H04L 63/20* (2013.01)

(58) Field of Classification Search
USPC .......................................... 726/23, 27, 2, 21
See application file for complete search history.

(56) References Cited

U.S. PATENT DOCUMENTS

| 6,101,533 | A | 8/2000 | Brandt et al. |
| 6,658,412 | B1 * | 12/2003 | Jenkins ............. G06F 17/30067 |
| 6,988,109 | B2 | 1/2006 | Stanley et al. |
| 7,107,272 | B1 | 9/2006 | Milligan et al. |
| 7,266,584 | B2 * | 9/2007 | Mullen ................ G06Q 10/107 |
| | | | 709/206 |
| 7,293,083 | B1 | 11/2007 | Ranous et al. |

(Continued)

*Primary Examiner* — Jude Jean Gilles
(74) *Attorney, Agent, or Firm* — Baker & Hostetler LLP

(57) ABSTRACT

A method for analyzing network interaction data is disclosed. Initially, network interaction data is received from a network over time. A predetermined model comprising predetermined values associated with network interaction parameters is also received. The received network interaction data is processed to determine the network interaction parameters and information regarding the network interaction data. A score for the network interaction data is calculated based on the predetermined model and the determined network interaction parameters. The score is compared to a threshold. The information regarding the network interaction data is then forwarded based on the comparison of the score to the threshold.

20 Claims, 7 Drawing Sheets

(56) References Cited

U.S. PATENT DOCUMENTS

| | | | | |
|---|---|---|---|---|
| 7,433,855 | B2* | 10/2008 | Gavan | H04J 3/175 |
| | | | | 379/111 |
| 7,523,386 | B2* | 4/2009 | Awada | G06F 17/30884 |
| | | | | 715/200 |
| 7,634,809 | B1 | 12/2009 | Schneider et al. | |
| 7,801,985 | B1* | 9/2010 | Pitkow | G06Q 20/027 |
| | | | | 704/246 |
| 8,145,560 | B2* | 3/2012 | Kulkarni | G06Q 40/00 |
| | | | | 379/114.14 |
| 8,631,115 | B2 | 1/2014 | Sheinfeld et al. | |
| 8,838,732 | B2* | 9/2014 | Pitkow | H04L 63/0218 |
| | | | | 704/246 |
| 9,231,982 | B2* | 1/2016 | Pitkow | H04L 63/0218 |
| 9,729,563 | B2* | 8/2017 | Pitkow | H04L 63/1416 |
| 2003/0025832 | A1 | 2/2003 | Swart et al. | |
| 2003/0233319 | A1 | 12/2003 | Lawrence | |
| 2004/0111728 | A1 | 6/2004 | Schwalm | |
| 2004/0215644 | A1 | 10/2004 | Edwards et al. | |
| 2005/0131885 | A1 | 6/2005 | Komatsu et al. | |
| 2006/0059238 | A1 | 3/2006 | Slater et al. | |
| 2006/0145812 | A1 | 7/2006 | Sajkowsky | |
| 2006/0195881 | A1 | 8/2006 | Segev et al. | |
| 2006/0206941 | A1 | 9/2006 | Collins | |
| 2006/0229902 | A1* | 10/2006 | McGovern | G06Q 10/06 |
| | | | | 705/321 |
| 2007/0192190 | A1 | 8/2007 | Granville | |
| 2007/0282819 | A1 | 12/2007 | Lynn et al. | |
| 2008/0181417 | A1* | 7/2008 | Pereg | G10L 25/00 |
| | | | | 381/17 |

\* cited by examiner

DATA TRANSFER FOR NETWORK INTERACTION FRAUDULENCE DETECTION

CROSS REFERENCE TO RELATED APPLICATIONS

This application is a continuation of U.S. patent application Ser. No. 14/987,169, filed Jan. 4, 2016, now U.S. Pat. No. 9,729,563 issued Aug. 8, 2017, which is a continuation of U.S. patent application Ser. No. 14/468,891, filed Aug. 26, 2014, now U.S. Pat. No. 9,231,982 issued Jan. 5, 2016, which is a continuation of U.S. patent application Ser. No. 12/859,150, filed Aug. 18, 2010, now U.S. Pat. No. 8,838,732 issued Sep. 16, 2014, which is a continuation of U.S. patent application Ser. No. 11/986,312, filed Nov. 19, 2007, now U.S. Pat. No. 7,801,985 issued Sep. 21, 2010, which claims priority to U.S. Provisional Patent App. No. 61/190,066, filed Mar. 22, 2007, all of which applications are incorporated herein by reference in their entireties.

BACKGROUND OF THE INVENTION

Network interaction fraudulence detection is typically performed by logging information from a plurality of locations and processing all the logged information from the plurality of locations at a processing location. Detection is improved by having logged information from a number of locations because information an be aggregated across all the locations. However, as the number of locations increases, the processing location must process an increasing amount of logged information. This will act as a bottleneck in the processing of logged information and ultimately impede scaling detection systems. It would be beneficial to be able to aggregate across locations without having a bottleneck in the processing for fraudulence so that detection systems can scale.

BRIEF DESCRIPTION OF THE DRAWINGS

Various embodiments of the invention are disclosed in the following detailed description and the accompanying drawings.

DETAILED DESCRIPTION

Figure 1:
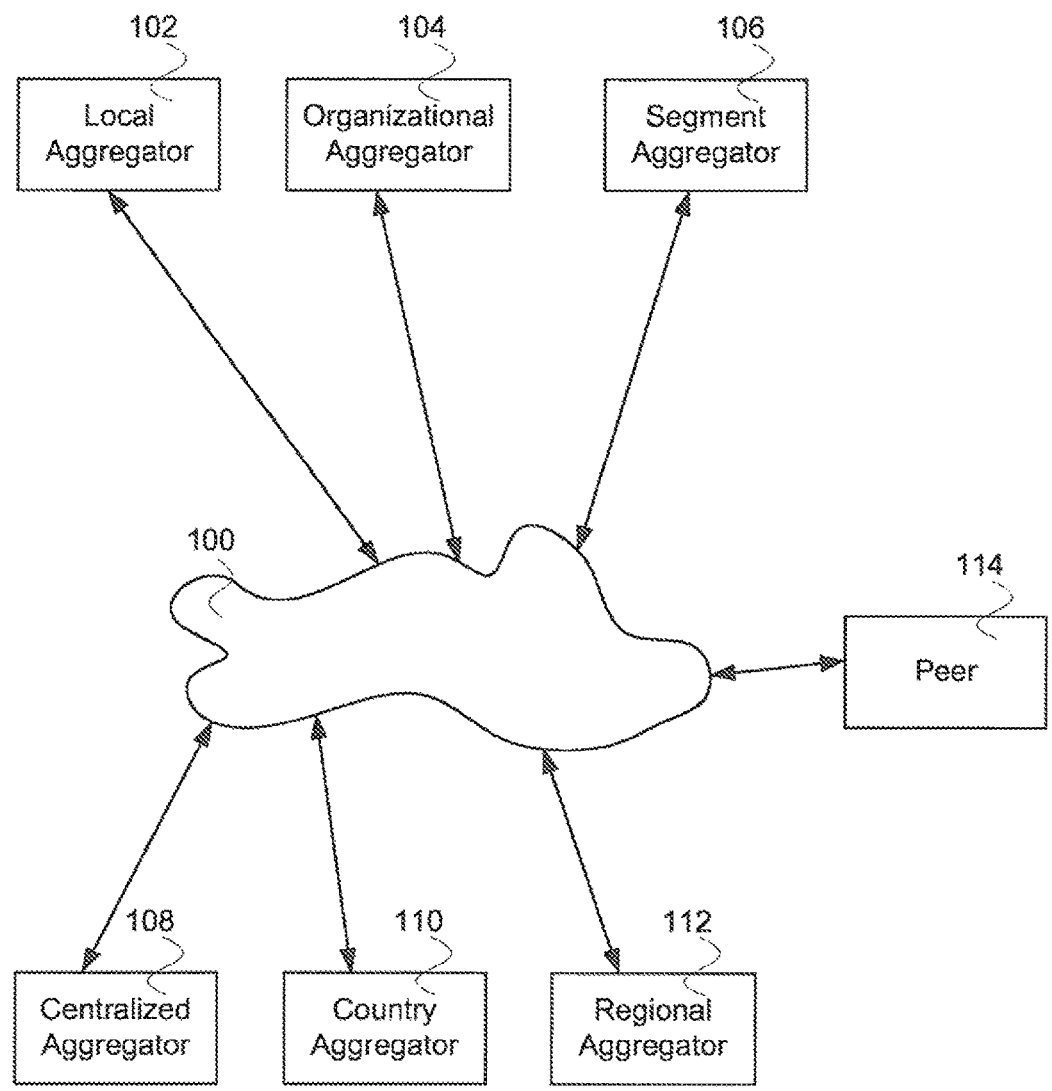
FIG. 1 is a block diagram illustrating an embodiment of a system for network interaction fraudulence detection.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described a being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data transfer for network interaction fraudulence detection is disclosed. Network interaction fraudulence detection becomes more accurate as more information regarding network interactions (e.g., clicks) is analyzed. In particular, correlations of aggregated network interaction information and the outcomes of each network interaction can be used to assess fraudulence or legitimacy of a given network interaction. Although more information is usually better, scaling the handling of more and more information is problematic. Effective and efficient use of network interaction information requires determination of what information to aggregate and where and how to aggregate it.

In some embodiments, determining the information or metadata to share regarding a given network interaction includes determining a confidence level or certainty level based on a model or combination of models which process information regarding a plurality of network interactions. Metadata can then be shared in the event that a confidence level is below a threshold, a certainty level is above a threshold and the processing indicates that the given network interaction is bad, a certainty level is above a threshold and the processing indicates that the given network interaction is good, a certainty is very low, a red alert is issued, a very bad site is identified, a random sampling is shared and/or any other appropriate manner of determining whether to share information.

A model inputs information from a layer about the given network interaction and determines that, for example, it is 70% certain that the IP address is an address that is the source of fraudulent network interaction activity. For example, the model may determine this certainty by using factors such as layer 3 network interaction information that shows that the source interact protocol (IP) address has been involved with spam and is not available for tracing. The model takes in factors and using a weighted total of the factors determines a certainty. In another example, the model determines this certainty by using factors such as layer 7 network information that shows that a session user visits 4 different sites where the user never converted, clicked on different products but where the spacing of the clicks has exactly the same timing (i.e., indicating an automatic pattern of access). The model takes in factors and has predetermined values associated with conditions. The maximum value of any of these conditions is then used to determine a certainty.

In various embodiments, an aggregator comprises a centralized location in order to be able to broadcast it to all or some other locations, a local aggregator, a regional aggregator, a country aggregator, one or more layer or tier aggregators, an organizational aggregator, a segment aggregator, and/or among one or more peers. In some cases, sharing may need to follow a set of rules, contractual obligations, may need to be filtered, be based on network topology, system network architecture, and/or any other appropriate sharing criteria.

The data or information about a network interaction to share can include just an IP address and a time stamp or include one or more of the following: an IP address, a time stamp, assessment of whether the IP address is a source of fraudulent network interactions, referrer information, metadata indicating confidence, measured information such as interclick time, processed information such as model parameters, interclick distributions, click statistics, HTTP data, TCP data, machine fingerprint data, and/or user fingerprint data. In some embodiments, information is determined by protocol—for example, all network interaction information regarding fraudulent sources is sent to a particular port or IP address whereas all legitimate sources are sent to a different port or IP address. In some cases, business rules or logic determine the information to share—for example, if a keyword is involved in the network interaction and the keyword has a value associated with it (e.g., a dollar amount), then a predetermined list of information is shared with a predetermined set of aggregators. In some cases, information to be shared is derived automatically as determined by monitoring a network interaction or as gleaned by probing the network based on information determined from monitoring. In some cases, information to be shared is derived manually. For example, model and data about network interactions are shared except when the network interaction involves a particular site (e.g., a military site or governmental site).

In some embodiments, rule-based determinations regarding what information to share and who to share it with may have conflicting determinations. In these cases, a conflict resolving set of rules or prioritization methodology for the rule, or a manual intervention (e.g., manual determination of which rule is to "Win") of configuration file input may be required.

FIG. 1 is a block diagram illustrating an embodiment of a system for network interaction fraudulence detection. In the example shown, peer 114, which measures or analyzes a single location's network interactions, is able to communicate with network 100. Peer 114 comprises a computer system or server that receives or measures network interactions and is able to analyze (e.g., perform statistical measures of network interactions, actively probe information regarding the network interaction, model, parameterize, compress, etc.) and communicate (e.g., exchange information with a remote analytical system, a remote aggregator of network interactions, a remote storage repository, etc.) regarding the measured network interactions. Network 100 enables communication to one or more aggregators of the network interaction information including local aggregator 102, organizational aggregator 104, segment aggregator 106, centralized aggregator 108, country aggregator 110, and/or regional aggregator 112.

Local aggregator 102 receives and analyzes network interactions in a locality. In various embodiments, a locality comprises a local network or systems attached to the local network, where the local network is associated with one of the following: a company, a physical plant, a building, a neighborhood, an area, a wireless hub, a wired hub, a router or switch, or any other constraint for a network or systems attached to a network.

Organizational aggregator 104 receives and analyzes network interactions of an organization. In various embodiments, an organization comprises a computer network or systems attached to the computer network, where the organization comprises one or more of the following: a company including one or more locations that can be geographically disparate, a government, a union, a non-profit organization, a university, an association, a partnership, or any other group of member entities where the member entities are associated with each other.

Segment aggregator 106 receives and analyzes network interactions of a segment. In various embodiments, a segment comprises a computer network or system attached to the computer network, where the segment comprises a group of companies, governmental departments, and/or other organizations/entities associated with a type of activity. For example, a group of advertisers, three advertising networks, a set of computer companies, a dozen telephone companies located in different countries, stock brokerages, insurance companies, etc.

Centralized aggregator 108 receives and analyzes network interactions from appliances monitoring network interactions. Appliances or analyzing systems or servers can be associated with local, organizational, segment, country, or regional aggregators as well as only centralized aggregator 108. In some embodiments, there are several tiers/layers/levels of aggregation.

Country aggregator 110 and regional aggregator 112 are geographically organized aggregators. In some cases, network interactions may aggregate at a local level; a plurality of local aggregators 102 are aggregated at a regional level; a plurality of regional aggregators 112 are aggregated at a country level; and a plurality of country aggregators 110 are aggregated at a centralized level.

In various embodiments, network 100 comprises one or more of the following: the Internet, the world wide web, a local area network, a wide area network, a wired network, a fiber network, a wireless network, or any other appropriate network enabling communication between systems analyzing, monitoring, and/or storing with network interactions.

In various embodiments, only one of the type of aggregators, a subset of the types of aggregators, all of the types of aggregators, or more than displayed types of aggregators included in FIG. 1 aggregate network interactions.

Figure 2A:
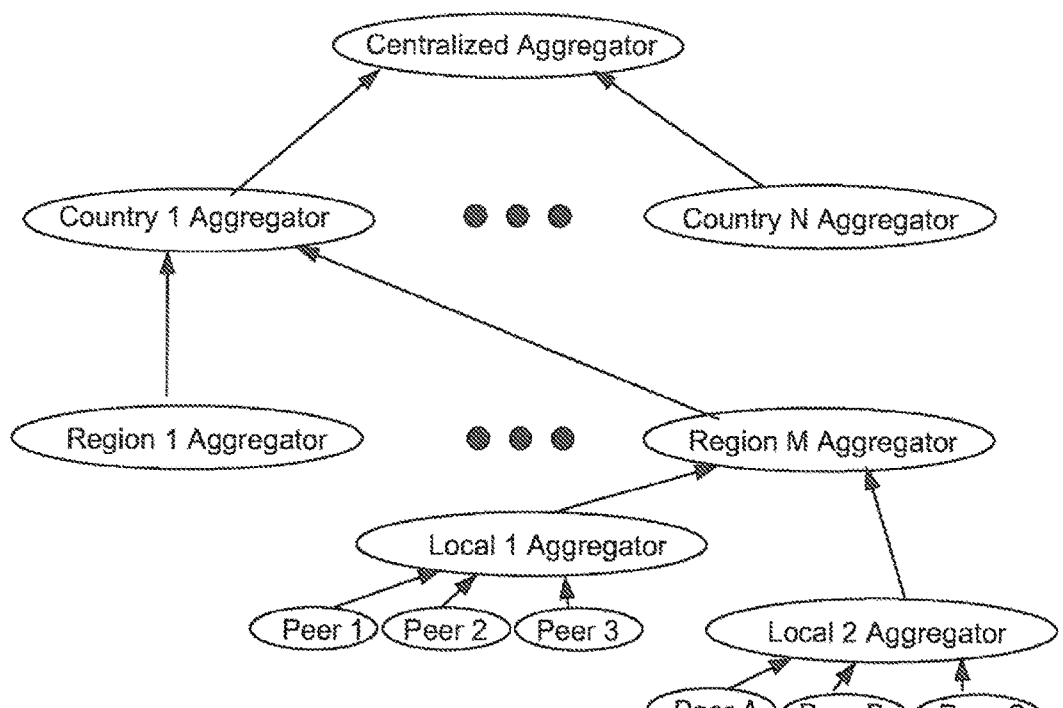
FIG. 2A is a block diagram illustrating an embodiment of tiered aggregation for network interactions.

FIG. 2A is a block diagram illustrating an embodiment of tiered aggregation for network interactions, in the example shown, network interactions from peer 1, peer 2, and peer 3 are aggregated by local 1 aggregator. Network interactions from peer A, peer B, and peer C are aggregated by local 2 aggregator. Network interactions from local 1 aggregator and local 2 aggregator are aggregated by region M aggregator. Network interactions from region 1 aggregator through region M aggregator are aggregated by country 1 aggregator, M region aggregators are represented in FIG. 2A by region 1 aggregator and region M aggregator. Network interactions from country 1 aggregator through country N aggregator are aggregated by centralized aggregator. N country aggregators are represented in FIG. 2A by country aggregator and country N aggregator.

Figure 2B:
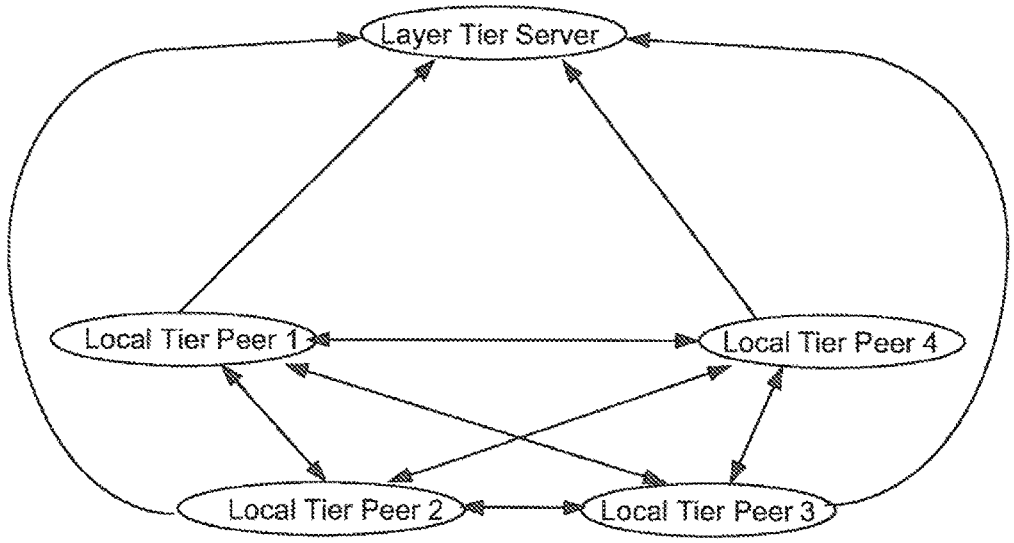
FIG. 2B is a block diagram illustrating an embodiment of tiered aggregation of network interactions.

FIG. 2B is a block diagram illustrating an embodiment of tiered aggregation of network interactions. In the example shown, layer tier server aggregates network interactions from local tier peer 1, local tier peer 2, local tier peer 3, and local tier peer 4. Local tier network interactions are also aggregated or shared by the peers in the local tier. So, each local tier peer receives network interaction information from other local tier peers—for example, local tier peer 1 receives network interaction information from local tier peer 2, local tier peer 3, and local tier peer 4.

Information about network interactions including processed data, model data, and model parameters is processed by peers and/or aggregators including filtering, prioritizing, ranking, discarding, or any other appropriate processing in order to be useful in determining network interaction fraudulence. In some cases, the transferring of information about network interactions may not be successful—for example, if connections and/or hardware resources are busy or unavailable. Transfers may need to be resent after a period of time or different periods of time depending on how many retries have been attempted (e.g., anti-entropy back off method to enable graceful scaling of sharing), sharing for aggregation may require transferring information.

Figure 3:
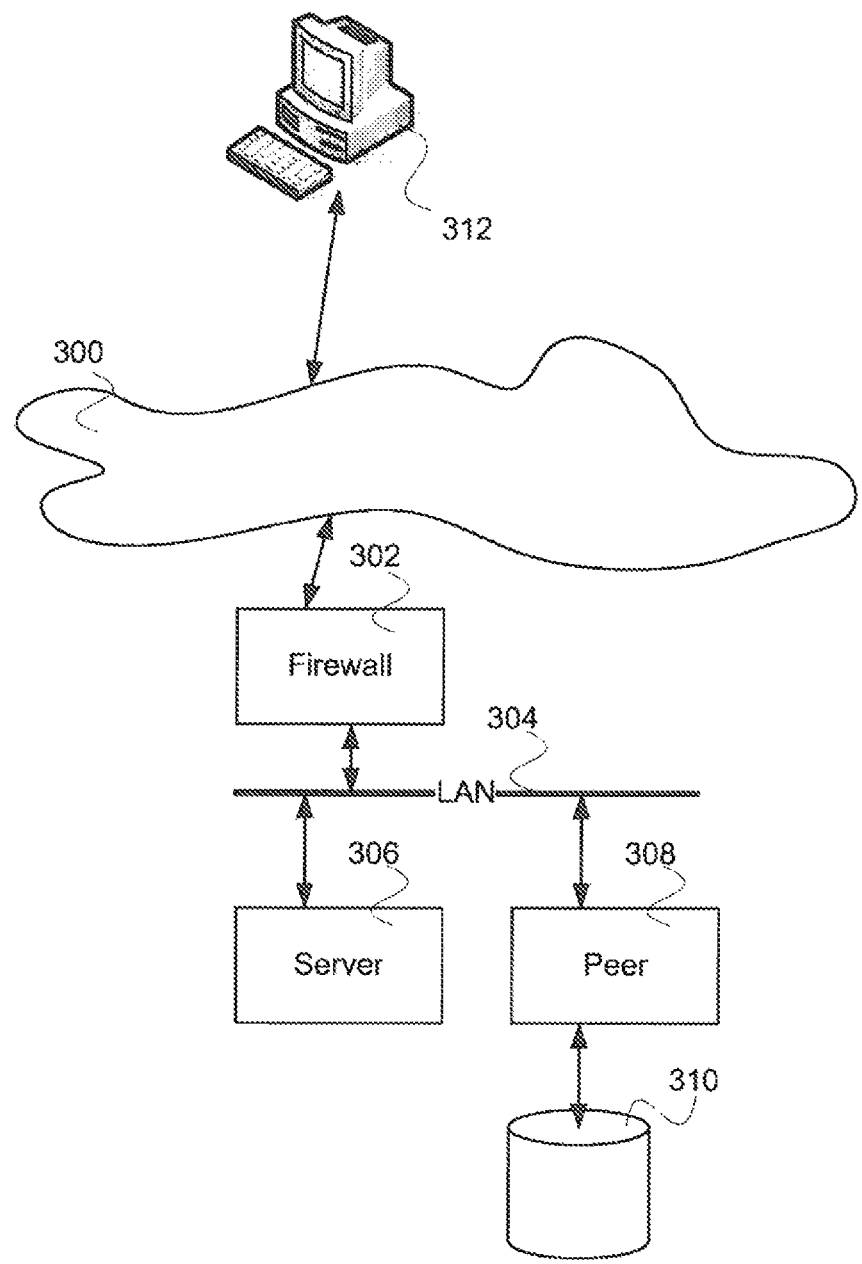
FIG. 3 is a block diagram illustrating an embodiment of a peer system monitoring network interactions.

FIG. 3 is a block diagram illustrating an embodiment of a peer system monitoring network interactions. In some embodiments, peer 308 of FIG. 3 is the same as peer 114 of FIG. 1 and/or peers in FIGS. 2A and 2B. In the example shown, a user using computer 312 can access a web page on server 306 via network 300. In various embodiments, server 306 is associated with an advertising network or an advertiser. In various embodiments, network 300 comprises one or more of the following: the Internet, the world wide web, a local area network, a wide area network, a wired network, a wireless network, or any other appropriate network. Server 306 can be accessed from network 300 via firewall 302 and local area network (LAN) 304. Peer 308 is able to monitor traffic to and from server 306 and is connected to LAN 304. In various embodiments, monitoring comprises detecting in hardware the network traffic or the network interactions to be monitored, detecting in real-time network traffic, capturing data in real-time, analyzing data in real-time, triggering real-time queries or forensics of IP addresses/network topology/routing tables/preferred paths, detecting layer 3 through layer 7 data from the monitored traffic, monitoring Ethernet traffic, or any other appropriate monitoring of network traffic. Peer 308 is able to store information on storage device 310. In some embodiments, peer 308 monitors traffic to and from server 306 by being between server 306 and LAN 304 by receiving and forwarding all traffic between network 300 and server 306. In this situation, all traffic is received and forwarded without substantially affecting network traffic, without substantially affecting a transaction involving the network traffic, and/or with less than 2 milliseconds of delay for the process of receiving and forwarding.

In some embodiments, peers can also be used to monitor traffic at other points in the network other than in front of or just beside a server—for example, on a trunk line, an internet service provider network, an advertising network, or any other appropriate traffic site.

In some embodiments, peer 308 is able to communicate with a server that analyzes aggregated network interaction information and/or provides model data based on network interaction data provided by peer 308. Models are used by peer 308 to calculate a preliminary score in real-time or quasi-real-time for detected network interactions. A preliminary score can be based on information associated with detected network interaction(s) as well as on stored parameters or models received from a model server or an analytics server.

Figure 4:
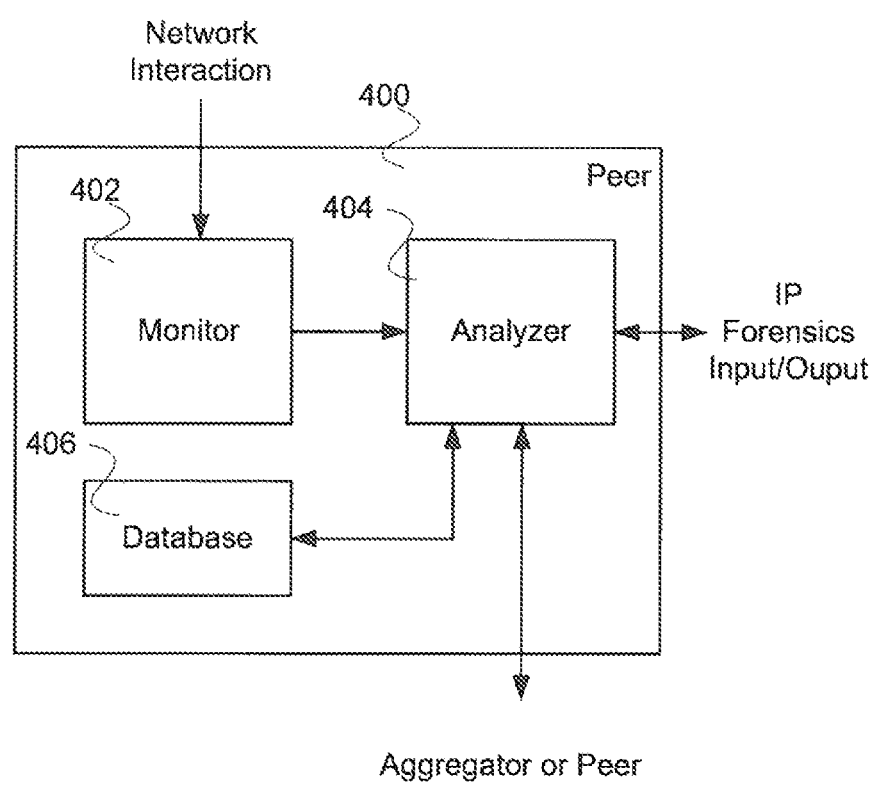
FIG. 4 is a block diagram illustrating an embodiment of a peer.

FIG. 4 is a block diagram illustrating an embodiment of a peer. In some embodiments, peer 400 of FIG. 4 the same as peer 308 of FIG. 3, Peer 114 of FIG. 1 and/or peers in FIGS. 2A and 2B. In the example shown, peer 400 includes monitor 402, analyzer 404, and database 406. Monitor 402 receives information regarding network interactions and/or network traffic and sends information to analyzer 404. Monitor 402 monitors information in real-time and Analyzer 404 can provide real-time or quasi-real-time assessment of information gathered by monitor 402. In some embodiments, monitor 402 receives information in real-time from peer hardware that is detecting the network traffic to be monitored. Analyzer 404 analyzes network interactions and/or network traffic by examining TCP/IP or hypertext transfer protocol/secure hypertext transfer protocol (HTTP/HTTPS) layer information and use that to make a preliminary scoring of the network interaction. Analyzer 404 can perform internet protocol (IP) forensics including probing the internet or world wide web to discover information about web sites and/or web routers or other networking components. Analyzer 404 can also send network interaction information and/or model information or model parameter information to one or more other peers and/or to one or more aggregators.

Preliminary scoring is based on models generated by analyzer 404 and/or received from a model server and/or an analytic server, and on other previously acquired network interaction information that is stored locally. Some models are specific in terms of scoring a network interaction—for example, a specific IP address is designated as scoring high because it was recently involved in a successful financial transaction or as scoring low because it was recently involved in sending significant amounts of spam and phishing email. Some models are generic in terms of scoring a network interaction—for example, an IP address that cannot be located with a probe immediately after being received in a click is designated as scoring low because it is likely fraudulent. Local peer stored history can indicate that a large number of network interactions are coming from one particular IP address in a short period of time; Analyzer 404 can indicate that under these circumstances that these network interactions are designated with a low preliminary score. Models used in preliminary scoring of monitored network interactions can be updated locally by updating model parameters using local peer network interaction data, updated from remote model and/or analytic servers either with new models or new model parameters, or any other appropriate manner of updating models for preliminary scoring.

Preliminary scoring or other analysis preformed by analyzer 404 can be real-time or in batch triode after a period of time. In some embodiments, monitoring and/or detection of a network interaction is done in real-time by peer hardware. Extraction and capture of relevant network interaction information (e.g., layer 3 through layer 7 information) for analysis is performed in real-time. In some embodiments, preliminary scoring is provided to a user in real-time or quasi-real-time.

In various embodiments, the network interaction comprises a click, a cookie, or any other appropriate network interaction. Analyzer 404 is able to probe in real time the IP routing and perform forensics. Analyzer 404 can store network interaction and/or network traffic information in database 206. Analyzer 204 can send network interaction reports to a model server and also can receive from a model server fraud model digests. An analytic server can calculate a final score for the network interaction based on information received at the analytic server. In some embodiments, the final score is sent to a report server or a reporter on an aggregator, from which a customer can access summarized legitimate and fraudulent network interactions. In some embodiments, analysis and model generation is performed on peer machines such as peer 400 within analyzer 404 instead of a separate analysis server.

Figure 5:
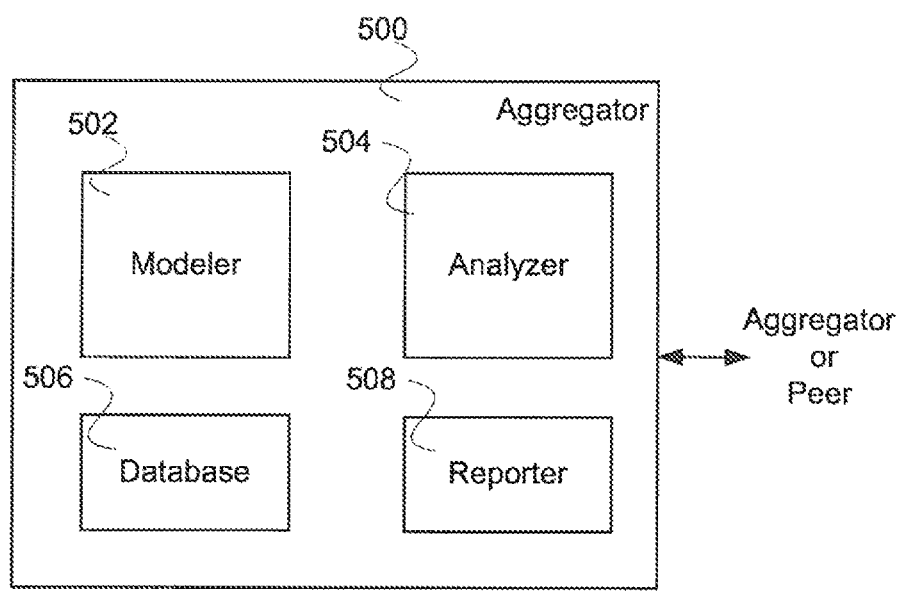
FIG. 5 is a block diagram illustrating an embodiment of an aggregator.

FIG. 5 is a block diagram illustrating an embodiment of an aggregator. In some embodiments, aggregator 500 of FIG. 5 is used to implement aggregators of FIGS. 1 and/or 2A and/or layer tier server of FIG. 2B. In the example shown, aggregator 500 includes modeler 502, analyzer 504, database 506, and reporter 508. Aggregator 500 communicates with other aggregators and/or one or more peers and aggregates network interactions. Aggregator receives network interaction information and uses the information to analyze network interactions in analyzer 504 and model network interactions in modeler 502. In various embodiments, a receiver of network information may accept, prioritize, rank, refuse, or any other appropriate processing or filtering as may be appropriate. Modeler 502 can develop models and parameter values for the models of network interactions which can be used to analyze network interactions. In some embodiments, models and parameter values are manually input into modeler 502 using a configuration file or another input method such as a interactive user interface. In some embodiments, models are not automatically developed in modeler 502. Analyzer 504 can analyze network interactions that have been aggregated from one or more monitoring peers over a period of time. In various embodiments, analysis of network interactions includes statistical analysis; analysis using models generated and parameterized by model 502; network topology/route analysis (e.g., analyzing if there are common sites or routes being used for network interactions); timing analysis (e.g., analysis of network interaction events from a site or a user at a site calculating a confidence level, a certainty level, a red alert, model parameters, interclick times, interclick distributions, statistics regarding clicks, composite measure of clicks; or any other appropriate analysis. Database 506 is used to store relevant network interaction information, analysis information, and model information. Reporter 508 is able to create reports regarding network interactions, analysis, and/or models based on network interaction information, model information, and analysis information including information stored in database 506.

Figure 6:
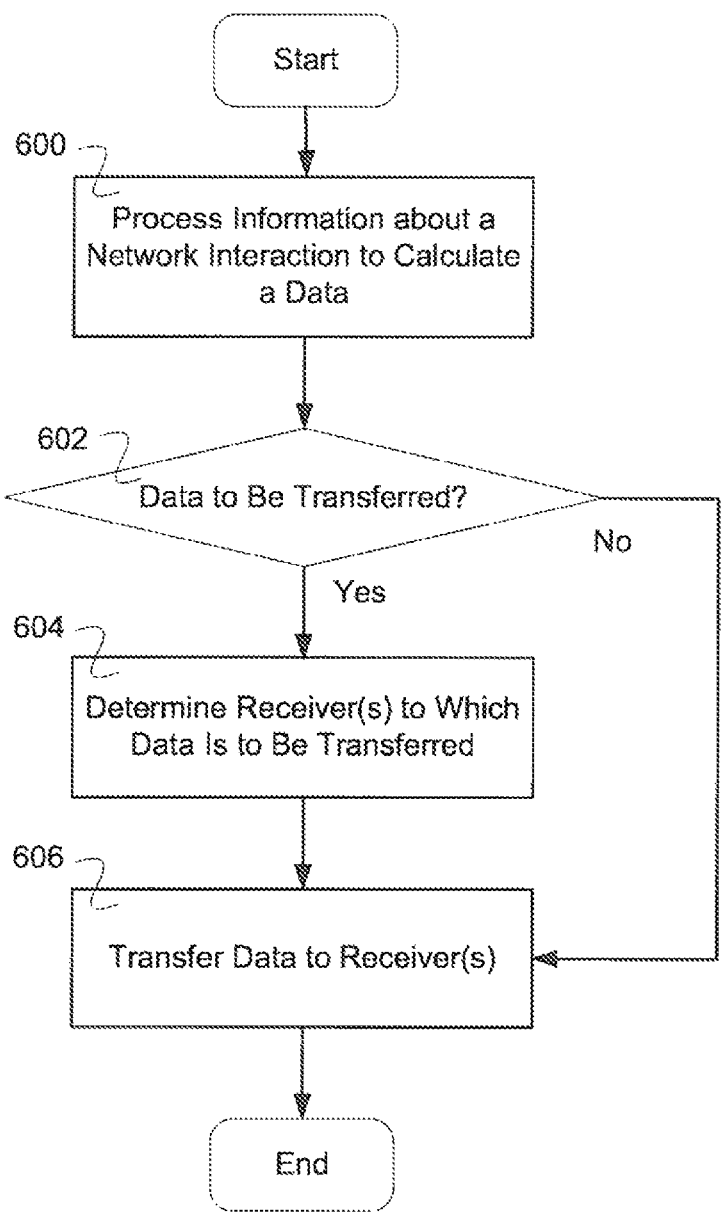
FIG. 6 is a flow diagram illustrating an embodiment of a process for data transfer for network interaction fraudulence detection.

FIG. 6 is a flow diagram illustrating an embodiment of a process for data transfer for network interaction fraudulence detection. In some embodiments, the process of FIG. 6 is executed on a peer such as peer 114 of FIG. 1, peer or local tier peer of FIGS. 2A and 2B, peer 308 of FIG. 3, and/or peer 400 of FIG. 4. In the example shown, in 600 information is processed about a network interaction to calculate a data. In 602, it is determined if the data is to be transferred. If the data is not to be transferred, the process ends. If the data is to be transferred, then in 604, receiver(s) is/are determined to which the data is to be transferred. In 606, data is transferred to the receiver(s).

In some embodiments, information about a network interaction comprises HTTP data, TCP data machine fingerprint data, or user fingerprint data.

HTTP data includes date, time, client IP address, user name, method, uniform resource identifier (URI) stem, URI query, protocol status, bytes sent, user agent, referrer, and/or cookie.

TCP data includes TCP packet info such as source port, destination port, sequence number, acknowledgement number, data offset, control flags, window, checksum, urgent pointer, options, padding, and/or data.

Machine fingerprinting data includes all information that javascript has access to including machine hardware characteristics, browser settings, browser environment (bookmarks, history), and browser customization (plugins that have been registered), and/or timing information between the client and other machines.

In some embodiments, machine fingerprinting data includes language and locale information such as browserLanguage, systemLanguage, User Language, defaultCharset, Locate Observes daylight savings time (DST), Currently DST, Standard Timezone Offset, Locale Date Format.

In some embodiments, machine fingerprinting data includes machine property information such as operating system and/or central processing unit class (oscpu/cpuClass), screen x dots per inch (XDPI), screen y dots per inch (YDPI), screen fontSmoothingEnabled, screen updateInterval, platform, Screen Width, Screen Height, and/or Processing Time msec.

In some embodiments, machine fingerprint data includes session information such as domain and/or start time in msec.

In some embodiments, machine fingerprint data includes browser property information such as appCodeName, appName, appVersion, productSub/appMinorVersion, userAgent, cookieEnabled, and/or online.

In some embodiments, machine fingerprint data includes component version information such as Interact Explore™ (IE), IE Javascript™ (JS) Major Version, IE JS Minor Version, IE JS Build Version, Outlook Express™ Address Book Version, Windows™ Desktop Update, DirectAnimation™, DirectAnimationJava™ Classes, DirectShow™ activemovie, Dynamic HTML Data Binding Tridata, DirectAnimation Java Classes DAJava™, Internet Connection Wizard, Internet Explorer 6, Java (Sun™) JAVAVM™, Internet Explorer Help, HTML Help, Microsoft™ Windows Media Player, NetMeeting™ Offline Browsing Pack, Microsoft Outlook Express 6 MailNews™ Task Scheduler, and/or Java (Sun) JAVAVM.

In some embodiments, machine fingerprinting data includes FireFox™ information such as Acrobat™, Flash™ QuickTime™ Java Plug-in, Director™, and/or Office™.

User fingerprint data includes capturing all user keystrokes and mouse movements between HTTP page requests including timing of the keystrokes and mouse movements at millisecond resolution.

Figure 7A:
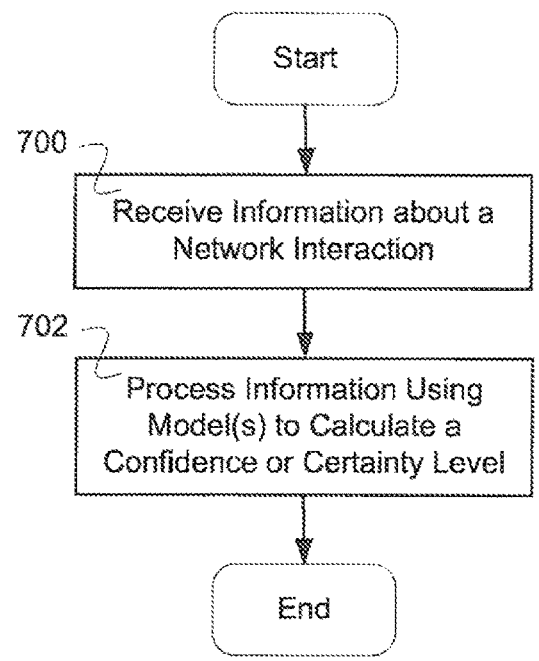
FIG. 7A is a flow diagram illustrating an embodiment of a process for processing information about a network interaction.

FIG. 7A is a flow diagram illustrating an embodiment of a process for processing information about a network interaction. In some embodiments, the process of FIG. 7A is used to implement 600 of FIG. 6. In the example shown, in 700 information is received about a network interaction. In 702, the information is processed using model(s) to calculate a confidence or certainty level.

Figure 7B:
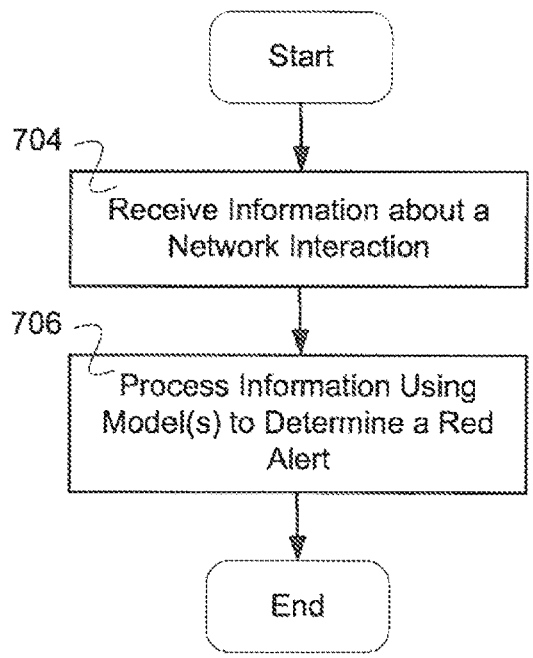
FIG. 7B is a flow diagram illustrating an embodiment of a process for processing information about a network interaction.

FIG. 7B is a flow diagram illustrating an embodiment of a process for processing information about a network interaction. In some embodiments, the process of FIG. 7B is used to implement 600 of FIG. 6. In the example shown, in 700 information is received about a network interaction. In 702, the information is processed using model(s) to calculate a red alert.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method for analyzing network interaction data for detection of network interaction fraudulence, the method comprising:

receiving network interaction data from a network over time, wherein the network interaction data is indicative of computer network interaction between a first computer system and a second computer system;

receiving a predetermined model comprising predetermined values associated with network interaction parameters;

processing the received network interaction data to determine the network interaction parameters and information regarding the network interaction data, wherein the information regarding the network interaction data is indicative of an attribute of the computer network interaction;

calculating a score for the network interaction data based on the predetermined model and the determined network interaction parameters;

comparing the score to a threshold; and forwarding, based on the comparison of the score to the threshold, the information regarding the network interaction data, wherein the information regarding the network interaction data is further indicative of network interaction fraudulence.

2. The method of claim 1, wherein the information regarding the network interaction data comprises metadata regarding the network interaction data.

3. The method of claim 2, wherein the metadata comprises an IP address, a time stamp, an assessment of whether the IP address is a source of fraudulent network interactions, referrer information, the score, interclick time, interclick distributions, click statistics, HTTP data, TCP data, machine fingerprint data, or user fingerprint data.

4. The method of claim 3, wherein the metadata indicates a source IP address that has been involved with spam, a source IP address is not available for tracing, a user that visited a predetermined number of sites without a conversion, a spacing between clicks has the same timing, a source IP address has recently sent a predetermined number of spam or phishing emails, a source IP address cannot be located with a probe within a predetermined amount of time, or a predetermined number of network interactions within a predetermined amount of time have the same source IP address.

5. The method of claim 3, wherein the HTTP data includes a date, a time, a client IP address, a user name, a uniform resource identifier (URI) stem, a URI query, a protocol status, bytes sent, a user agent, a referrer, or a cookie.

6. The method of claim 3, wherein the TCP data includes a source port, a destination port, a sequence number, an acknowledgement number, a data offset, control flags, a window, a checksum, an urgent pointer, or padding.

7. The method of claim 3, wherein the machine fingerprinting data includes machine hardware characteristics, browser settings, browser environment, browser customization, or timing information between the machine and other machines.

8. The method of claim 3, wherein the user fingerprint data includes user keystrokes, mouse movements, timing of the user keystrokes, or timing of the mouse movements.

9. The method of claim 1, wherein forwarding the information regarding the network interaction data comprises forwarding the information regarding the network interaction data to at least one aggregator.

10. The method of claim 9, wherein forwarding the information regarding the network interaction data to the at least one aggregator comprises determining one or more aggregators to which the information regarding the network interaction data is to be forwarded.

11. The method of claim 1, wherein receiving the predetermined model comprises generating a model comprising values associated with other network interaction parameters.

12. The method of claim 1, wherein comparing the score to the threshold comprises detecting a fraudulent network interaction.

13. A system for analyzing network interaction data for detection of network interaction fraudulence, the system comprising:

at least one processor; and a memory in electrical communication with the at least one processor, wherein the memory stores instructions which when executed cause the at least one processor to perform operations comprising:

receive network interaction data from a network over time, wherein the network interaction data is indicative of computer network interaction between a first computer system and a second computer system;

receive a predetermined model comprising predetermined values associated with network interaction parameters;

process the received network interaction data to determine the network interaction parameters and information regarding the network interaction data, wherein the information regarding the network interaction data is indicative of an attribute of the computer network interaction;

calculate a score for the network interaction data based on the predetermined model and the determined network interaction parameters;

compare the score to a threshold; and forward, based on the comparison of the score to the threshold, the information regarding the network interaction data, wherein the information regarding the network interaction data is further indicative of network interaction fraudulence.

14. A non-transitory computer-readable medium storing instructions that, when executed by at least one processor of a computing system, cause the computing system to perform a method for analyzing network interaction data for detection of network interaction fraudulence, the method comprising:

receiving network interaction data from a network over time, wherein the network interaction data is indicative of computer network interaction between a first computer system and a second computer system;

receiving a predetermined model comprising predetermined values associated with network interaction parameters;

processing the received network interaction data to determine the network interaction parameters and information regarding the network interaction data, wherein the information regarding the network interaction data is indicative of an attribute of the computer network interaction;

calculating a score for the network interaction data based on the predetermined model and the determined network interaction parameters;

comparing the score to a threshold; and forwarding, based on the comparison of the score to the threshold, the information regarding the network interaction data, wherein the information regarding the network interaction data is further indicative of network interaction fraudulence.

15. The method of claim 1, wherein the first computer system comprises a client computer system and the second computer system comprises a server computer system.

16. The method of claim 15, wherein the server computer system is associated with at least one of an advertiser and an advertising network.

17. The system of claim 13, wherein the first computer system comprises a client computer system and the second computer system comprises a server computer system.

18. The system of claim 17, wherein the server computer system is associated with at least one of an advertiser and an advertising network.

19. The non-transitory computer-readable medium of claim 14, wherein the first computer system comprises a client computer system and the second computer system comprises a server computer system.

20. The non-transitory computer-readable medium of claim 19, wherein the server computer system is associated with at least one of an advertiser and an advertising network.

\* \* \* \* \*